(12) United States Patent
Wang et al.

(10) Patent No.: US 7,085,259 B2
(45) Date of Patent: Aug. 1, 2006

(54) ANIMATED AUDIO MESSAGING

(75) Inventors: Xuejun Wang, Malden, MA (US); Dongxiao Ji, Stoneham, MA (US); Joseph D. Plansky, Bedford, MA (US)

(73) Assignee: Comverse, Inc., Wakefield, MA (US)

( * ) Notice: Subject to any disclaimer, the term of this patent is extended or adjusted under 35 U.S.C. 154(b) by 781 days.

(21) Appl. No.: 09/918,704

(22) Filed: Jul. 31, 2001

(65) Prior Publication Data

US 2003/0035412 A1 Feb. 20, 2003

(51) Int. Cl.
*H04L 12/66* (2006.01)
(52) U.S. Cl. .................................... 370/352; 704/235
(58) Field of Classification Search ............... 370/352, 370/354, 401, 428; 704/235, 260, 270.1; 345/473
See application file for complete search history.

(56) References Cited

U.S. PATENT DOCUMENTS

| | | | | |
|---|---|---|---|---|
| 4,260,229 A * | 4/1981 | Bloomstein | ................ | 704/235 |
| 4,884,972 A * | 12/1989 | Gasper | ....................... | 434/185 |
| 4,913,539 A * | 4/1990 | Lewis | ......................... | 352/12 |
| 5,608,839 A * | 3/1997 | Chen | .......................... | 704/235 |
| 5,625,764 A * | 4/1997 | Tsujimoto et al. | .......... | 345/640 |
| 5,630,017 A * | 5/1997 | Gasper et al. | ............ | 704/270.1 |
| 5,657,426 A * | 8/1997 | Waters et al. | ............... | 704/276 |
| 5,734,794 A * | 3/1998 | White | ........................ | 704/275 |
| 5,899,971 A * | 5/1999 | De Vos | ...................... | 704/236 |
| 5,963,217 A * | 10/1999 | Grayson et al. | ............ | 345/473 |
| 5,969,719 A * | 10/1999 | Tsujimoto | ................... | 715/727 |
| 6,167,562 A * | 12/2000 | Kaneko | ...................... | 717/109 |
| 6,181,351 B1 * | 1/2001 | Merrill et al. | ............... | 345/473 |
| 6,232,965 B1 * | 5/2001 | Scott et al. | ............... | 715/500.1 |
| 6,271,841 B1 * | 8/2001 | Tsujimoto | ................... | 715/839 |
| 6,366,885 B1 * | 4/2002 | Basu et al. | ................. | 704/270 |
| 6,397,187 B1 * | 5/2002 | Vriens et al. | ............... | 704/275 |
| 6,522,417 B1 * | 2/2003 | Kakigahara et al. | ....... | 358/1.15 |
| 6,677,967 B1 * | 1/2004 | Sawano et al. | ............. | 715/839 |
| 6,766,299 B1 * | 7/2004 | Bellomo et al. | ............ | 704/276 |
| 2002/0116263 A1 * | 8/2002 | Gouge | ......................... | 705/14 |
| 2002/0194006 A1 * | 12/2002 | Challapali | ................... | 704/276 |

OTHER PUBLICATIONS http://www.redted.com/.
http://www.lifefx.com/FaceOfTheInternet/introA.html and link from main page to the index.

* cited by examiner

*Primary Examiner*—Duc Ho
*Assistant Examiner*—Phuongchau Ba Nguyen
(74) *Attorney, Agent, or Firm*—Mintz, Levin, Cohn, Ferris, Glovsky and Popeo, P.C.

(57) ABSTRACT

A method for providing an animated audio message includes wirelessly receiving indicia of an audio message and an image, and animating the image in association with the audio message to produce an animated audio message. A system for providing animated audio messages includes a wireless interface that can receive wireless communications that provide or identify an audio message and provide or identify an image. An animator is coupled to the wireless interface and can animate the image in accordance with the audio message to form an animated audio message. An animation interface is coupled to the animator and can transfer the animated audio message from the animator toward a desired destination.

42 Claims, 8 Drawing Sheets

ANIMATED AUDIO MESSAGING

FIELD OF THE INVENTION

The invention relates to telecommunications and more particularly to messaging using audio messages and animated video images.

BACKGROUND OF THE INVENTION

Telecommunications are increasing rapidly both in amount and variety. Fairly recent technological advances in telecommunications include cellular phones and other mobile phones, and e-mail. It has been estimated that e-mail already outnumbers traditional mail by over 10 to 1, and this ratio is expected to increase. E-mail can be transmitted through hard-wired computers, but also through wire digital assistants (PDAs). Mobile communication devices can also enable "instant messaging" between parties. With people more and more mobile, they communicate more and more using mobile communication devices instead of, e.g., hard-wired phones.

With mobile communications increasing, people want more functionality from their mobile communication devices. Despite this, people also want to have mobile communications devices that are smaller because they do not want to carry bulky, heavy devices, and because people are tending to carry more such devices, e.g., pagers, mobile phones, PDAs, and wireless e-mail devices. They also want their devices to be faster, because time is often at a premium, and cheaper. More functionality, however, is often in direct conflict with smaller, lighter, faster, cheaper devices because more, and more complicated, functions require more memory and processing power. This translates into bigger, more expensive, devices.

SUMMARY OF THE INVENTION

The invention provides techniques to enable persons to provide animated audio messages to desired recipients. Animated audio messages may be, e.g., audio messages accompanied by an image that moves in concert with the audio message. Playing the animated audio message to the recipient simulates, e.g., the sender of the message, speaking the message. Alternatively, images other than the sender may be used. The image may be a standard image stored in an animation message system (AMS), or may be uploaded/downloaded to the AMS, e.g., by the animated message sender. An audio message may be stored in a voice-mail system before or after selection of the image(s) to accompany the audio message.

In general, in an aspect, the invention provides a method for providing an animated audio message. The method includes wirelessly receiving indicia of an audio message and an image, and animating the image in association with the audio message to produce an animated audio message.

Implementations of the invention may include one or more of the following features. The image can be stored and identified by the indication of the image. The animated audio message can be stored and information for retrieving the animated audio message can be sent toward an intended recipient of the animated audio message. The animated audio message can be stored corresponding to a web address. The web address can be of a web page supported by an animation message system. The information for retrieving the animated audio message can be supplied in a format that is indicated by a wireless communication. This format can be, e.g., e-mail or mobile-terminated short message service format. The audio message can be stored in and received from a voice-mail system. The indicia of the audio message and the image can be received in one wireless communication, or multiple wireless communications. Indicia of the audio message can be text that is converted to the audio message, or information identifying an audio message.

In general, in another aspect, the invention provides a method for providing an animated audio message as selected in a wireless communication. The method includes receiving indicia of an animated audio message and a recipient. The animated audio message includes an image that changes corresponding to audio of the message. At least some of the indicia of the animated audio message is received through a wireless communication. Information is sent toward the recipient for the recipient to be able to view and listen to the message.

Implementations of the invention may include one or more of the following features. The information sent toward the recipient may be a URL of a web site. The audio of the message may be received from a voice-mail system. The image may be one of multiple stored images that is selected according to the received indicia.

In general, in another aspect, the invention provides a computer program product including computer-executable instructions. The instructions are set up for causing a computer to wirelessly receive an audio-message indication, to wirelessly receive an image indication, to associate the image with the audio message, and to animate the image according to the audio message to produce an animated audio message.

Implementations of the invention may include one or more of the following features. Information for retrieving the animated audio message may be sent toward an intended recipient of the animated audio message. The animated audio message may be stored in association with a web page or other packet-switched-network site. The information for retrieving the animated audio message may include an address of the web page or other site. The information can be formatted in a format indicated wirelessly, and the format may be, e.g., e-mail or mobile-terminated short message service format.

In general, in another aspect, the invention provides a system for providing animated audio messages. The system includes a wireless interface that can receive wireless communications that provide or identify an audio message and provide or identify an image. An animator is coupled to the wireless interface and can animate the image in accordance with the audio message to form an animated audio message. An animation interface is coupled to the animator and can transfer the animated audio message from the animator toward a desired destination.

Implementations of the invention may include one or more of the following features. The animation interface can transfer the animated audio message toward the desired destination in a wireless communication. Audio and image engines can convert the audio message and image to appropriate formats. Storage devices can store the audio message and the image. A streaming server can transfer the animated audio message as a streaming file. A web server can provide access to the animated audio message via a web page. Interfaces can provide an address of the web page in a mobile-terminated short message service or e-mail format.

Various aspects of the invention may provide one or more of the following advantages. Mobile-communication device users can produce and send animated audio messages. Mobile-communication device users can produce and send personalized animated audio messages, such as electronic greeting cards. Mobile-communication device users can view and listen to animated audio messages. Animated audio messages can be produced, sent, and played using devices, including mobile communication devices, without requiring specialized equipment in the device for playing the messages.

These and other advantages of the invention, along with the invention itself, will be more fully understood after a review of the following figures, detailed description, and claims.

DETAILED DESCRIPTION OF PREFERRED EMBODIMENTS

Figure 1:
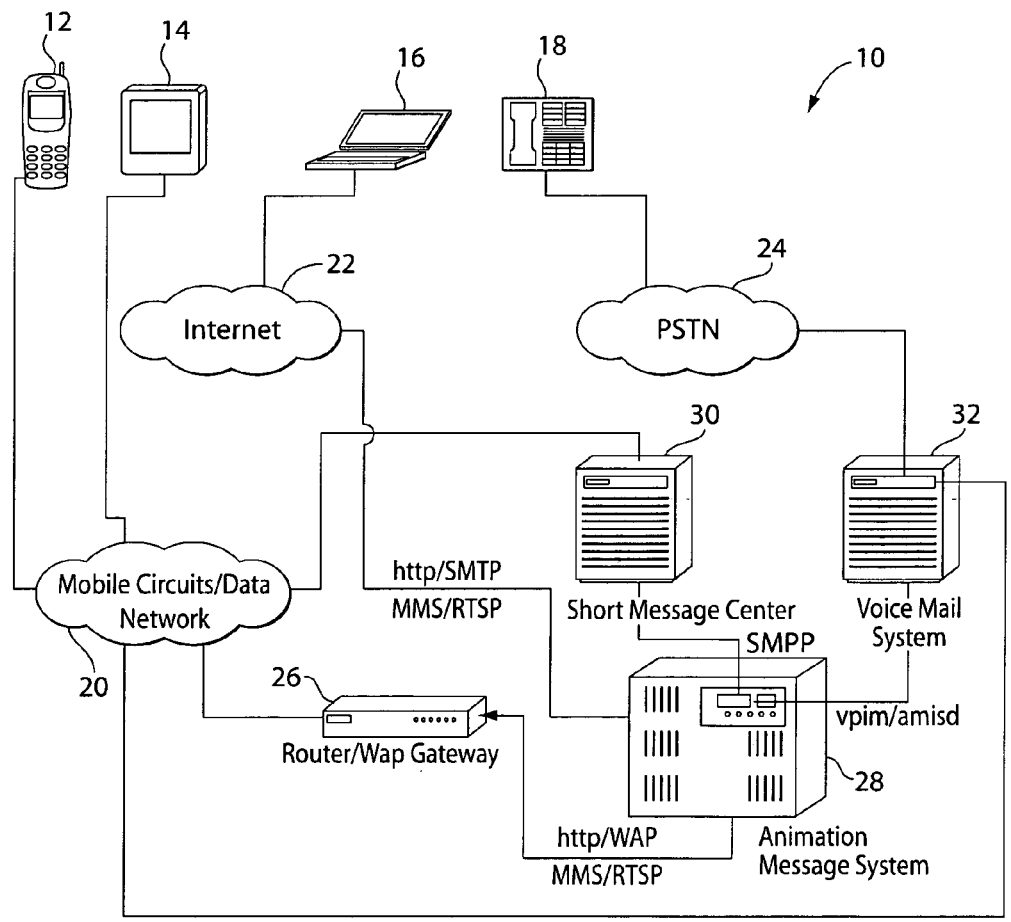
FIG. 1 is a schematic diagram of a telecommunications system.

Referring to FIG. 1, a communication system 10 includes a mobile communication device (MCD), here a portable phone 12, a personal digital assistant (PDA) 14, a computer 16, and a hard-wired telephone 18, connected through a mobile circuit/data network 20, the global packet-switched network known as the Internet 22, a public-switched telephone network (PSTN) 24, and a router/WAP gateway 26, respectively as shown, to an animation message system (AMS) 28, a short message center (SMC) 30, and a voice-mail system 32. The networks 20, 22, 24 and the router/gateway 26 provide for bi-directional communication between the phones 12, 18, the PDA 14, and the computer 16, and the AMS 28, the SMC 30, and the voice-mail system 32. The Internet 22 and the PSTN 24 are well-known networks, and the mobile circuits/data network 20 provides an interface between hard-wired and wireless communications, e.g., a cellular network.

The telephones 12, 18 are configured to communicate bi-directionally with the voice-mail system 32. For example, the mobile phone 12 can com network 20, that communicates with the voice-mail system 32. Thus, through the network 20, the mobile phone 12 can, e.g., transmit voice or other audio messages for storage in the voice-mail system 32. Likewise, the hard-wired telephone 18 can transmit voice or other audio messages through the PSTN 24 for storage in the voice-mail system 32. The phones 12, 18 can also receive audible messages from the voice-mail system 32 to allow/promote interaction with the system 32, e.g., by receiving and responding to directions from the voice-mail system 32.

The mobile phone 12 is also configured to communicate with the AMS 28. The phone 12 communicates with the AMS 28 through the mobile circuits/data network 20 and the router/WAP gateway 26. The phone 12 is configured to communicate with the AMS 28 such that a user of the phone 12 can log in to a website of the AMS 28 and provide information to select an image that is stored in the AMS 28, and to associate that image with an audio message stored in the voice-mail system 32. Communications between the router/WAP gateway 26 and the AMS 28, for communications involving the phone 12, are processed in accordance with the wireless application protocol (WAP). The phone 12 is also configured to receive communications from the AMS 28 in order to facilitate selection of the image and association of a desired audio message.

The devices 12, 14, 16 are configured to receive communications from the AMS 28 and/or the SMC 30 in mobile terminated short-message service (MT-SMS) format or e-mail format, as appropriate. The phone 12 can receive MT-SMS messages from the SMC 30 via the network 20. Each of the devices 12, 14, 16 are configured to receive digital data as e-mail-formatted messages from the AMS 28.

Each of the devices 12, 14, 16 are further configured to access a web page stored in the AMS 28. The devices 12 and 14 are configured to communicate with the AMS 28 through the router/WAP gateway 26 and the network 20 to access a web page of the AMS 28 and to download information, e.g., an animated audio message, from the web page of the AMS 28. An animated audio message can be, e.g., an electronic, or virtual, greeting card. The computer 16 is configured to communicate, e.g., in Hyper Text Transfer Protocol (HTTP) or Simple Mail Transfer Protocol (SMTP) as appropriate to access a desired web page stored in the AMS 28 and to download data from that web page. The devices 12, 14, 16 are further configured to play animated audio messages (e.g., by audibly broadcasting an audio portion of the message and by visually displaying an image portion of the message).

The voice-mail system 32 is a standard voice-mail system modified to provide audio messages to the AMS 28. The voice-mail system 32 provides standard voice-mail features for receiving and storing audio messages from the phones 12, 18 via the networks 20, 24. Additionally, the voice-mail system 32 is configured to provide audio messages to the AMS 28 when instructed to do so. For example, the voice-mail system 32 is configured to receive an audio message for storage from the phones 12, 18, and to provide an option for a user of the phone 12 or 18 to provide an indication that the audio message (e.g., voice-mail) is to be associated with an image by the AMS 28. For example, the voice-mail system 32 may prompt a user that has provided an audio message for storage to press a certain button on a keypad of the phone 12 or 18 to indicate that the audio message is to be associated with an image. The user may further be prompted to enter other information to help identify the audio message so that the audio message can be associated with a desired image. The voice-mail system 32 is configured to provide audio messages, either in real-time or stored audio messages, to the AMS 28, and to otherwise communicate with the AMS 28 using Voice Profile for Internet Mail (VPIM) or Audio Message Interchange Service digital (AMISD) formats as appropriate. The voice-mail system 32 can send the recorded message along with other identifying information, such as information regarding the sender and/or the recipient, to the AMS 28.

The SMC 30 is a known system for providing Short Message Service (SMS) messages to wireless devices via a wireless network, to receive such messages from wireless devices through a wireless network, and to communicate with other devices, here the AMS 28, as appropriate. The SMC 30 can communicate bi-directionally with the AMS 28 using a Short Message Peer-to-Peer (SMPP) protocol. The SMC 30 can receive data in the SMPP protocol from the AMS 28, and in response thereto provide Mobile-Terminated-SMS (MT-SMS) messages through the network 20 to wireless devices such as the mobile phone 12 or the PDA 14. Also, the SMC 30 is configured to receive SMS messages via the network 20 from the phone 12 and the PDA 14, and to provide appropriate data in the SMPP protocol to the AMS 28. For example, the SMC 30 can provide indicia of a Universal Resource Locator (URL), corresponding to a web page of the AMS 28, to the devices 12, 14, to receive URL indications from the devices 12, 14, and to provide corresponding indicia to the AMS 28 to access a web page corresponding to an indicated URL. The AMS 28 is a server configured to process audio messages from the voice-mail system 32 with video images stored in the AMS 28 into animated audio messages.

Figure 2:
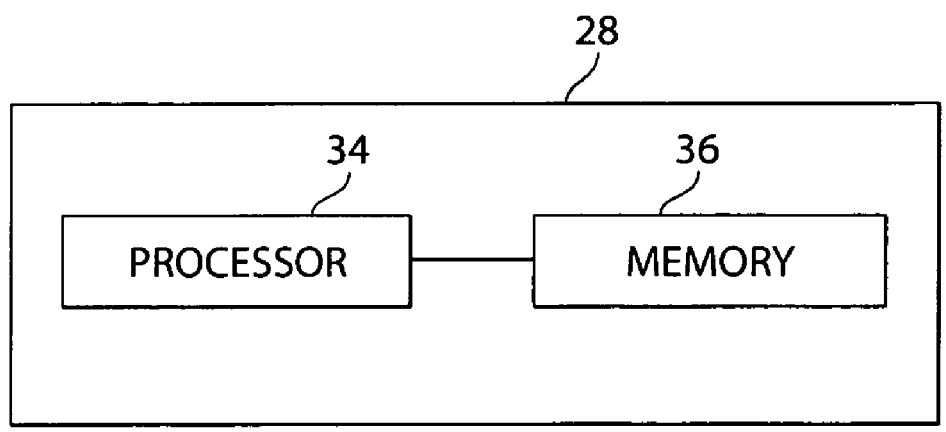
FIG. 2 is a schematic block diagram of portions of an Animation Message System shown in FIG. 1.

Referring to FIG. 2, the AMS 28 includes a processor 34 coupled for bi-directional communication with a memory 36. The processor 34 is configured to execute instructions stored in the memory 36 to perform various operations in accordance with the descriptions of functions provided above and below. The memory 36 is configured to store instructions that are executable by the processor 34. For example, the memory 36 can be Random Access Memory (RAM), Read-Only Memory (ROM), or hard or floppy discs, or combinations of any of these, and/or any other types of memory for storing such instructions. The stored instructions form software code that is executable by the processor 34 to carry out the functions described above and below.

Figure 3:
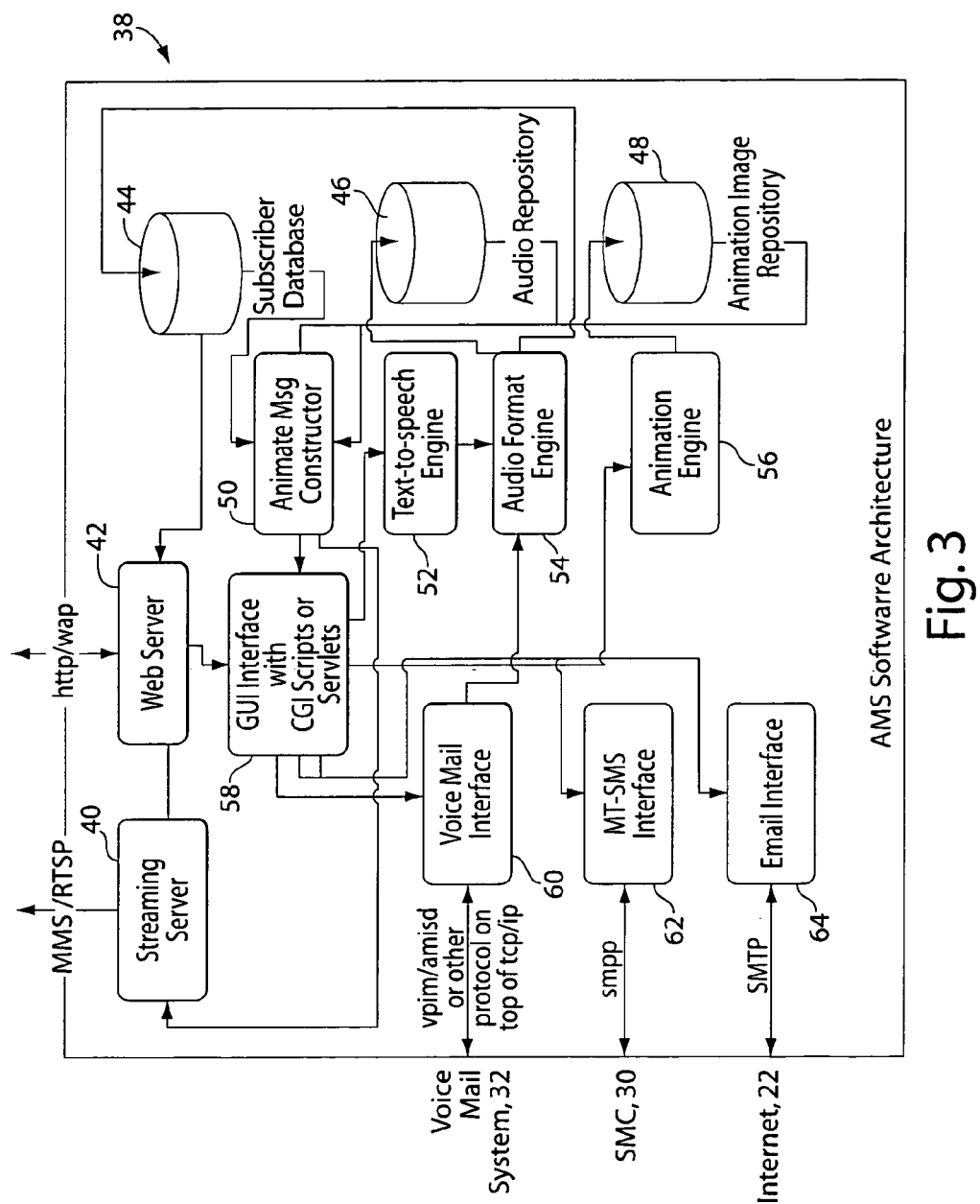
FIG. 3 is block diagram of a software architecture of the Animation Message System shown in FIG. 1.

Referring to FIG. 3, with further reference to FIG. 1, a software architecture 38 of the AMS 28 includes a streaming server 40, a web server 42, a subscriber database 44, an audio repository 46, an animation image repository 48, an animated message constructor 50, a text-to-speech engine 52, an audio format engine 54, an animation engine 56, a graphical user interface 58 with CGI scripts or servlets, a voice-mail interface 60, an MT-SMS interface 62, and an e-mail interface 64. The software architecture 38 is configured such that the AMS 28 can receive audio messages and video images, convert them to appropriate formats if needed, animate the audio message using the image, and provide the animated audio message to a desired recipient.

The Graphical User Interface (GUI) 58 includes Common Gateway Interface (CGI) scripts or servlets and is the interface that allows a user to select an animation image and an audio message. The CGI scripts or servlets are used to handle user inputs, e.g., from the web server 42. The GUI 58 can communicate with the web server 42 to receive indications from a user to perform various functions. For example, the user can provide indications to select a delivery type, to enter recipient information for an animated message, to select an audio message, to select an image, and/or to provide text to be converted to speech by the text-to-speech engine 52. Indicia from the user to select an audio message and/or an image can be, e.g., an address of a storage area of the message or image. The GUI 58 is further configured to send URLs of web pages to the MT-SMS interface 62 or to the e-mail interface 64 based upon a delivery type selected by the user. Also, the GUI 58 is configured to receive data from the animated message constructor 50 indicative of a storage location of an animated audio message.

The voice-mail interface 60 is configured to provide an interface between the voice-mail system 32 and the AMS 28, specifically the audio fo voice-mail interface 60 is configured to receive indicia from the GUI 58 as to which audio message stored in the voice-mail system 32 to use with an image to provide an animated audio message. The voice-mail system 60 is configured to communicate with the voice-mail system 32 in VPIM or AMISD protocols, or any other protocol that is defined on top of Transmission Control Protocol/Internet Protocol (TCP/IP). The interface 60 is further configured to transfer messages received from the voice-mail system 32 to the audio format engine 54.

The MT-SMS interface 62 is configured to process communications between the GUI 58 and the SMC 30. The MT-SMS interface 62 is configured to receive indicia from the GUI 58 of a URL of a web page containing an animated audio message. The interface 62 is further configured to process the URL indicia into a message in the SMPP protocol and transfer the SMPP protocol message to the SMC 30 for further transfer to an intended recipient.

The e-mail interface 64 is configured to transfer URL indicia from the GUI 58 to the internet 22. The e-mail interface 64 is configured to operate with an external e-mail server using Simple Mail Transfer Protocol (SMTP) protocol. The e-mail interface 64 receives indicia of the URL of a web page containing an animated audio message and produces an SMTP formatted e-mail message that the interface 64 sends to the Internet 22 for further transfer to an intended recipient.

The text-to-speech engine 52 is configured to convert text messages received from the GUI 58 to speech. The engine 52 is configured to receive text messages as input from the GUI 58 and convert the received text into digital audio format. The engine 52 is further configured to send the digital audio format data to the audio format engine 54. Preferably, the text-to-speech engine 52 is based on an IBM® text-to-speech engine or an MS text-to-speech engine.

The audio format engine 54 is configured to process audio messages for storage and to update the subscriber database 44. The audio format engine 54 is configured to receive audio messages in the form of digital audio files from the text-to-speech engine 52 and from the voice-mail interface 60. If the received file is not in a desired format such as MPEG4, then the engine 54 converts the audio file into a desired format, such as MPEG4. The audio format engine 54 can store the audio file, in the desired format, in the audio repository 46. Also, the audio format engine 54 can communicate with the subscriber database 44 to update a corresponding user record in the subscriber database 44. The user record is updated with user information for the voice-mail message, the format of the message, and the location and file name of the message.

The animation engine 56 is configured to ensure proper format of image or picture files for storage in the animation image repository 48. The animation engine 56 receives images or picture files from the GUI 58. The engine 56 is configured to convert the received images or pictures, if necessary, into an animation format and store the files in a desired animation format in the animation image repository 48. Standard images may be stored in the animation image repository or non-standard images may be uploaded from a user through the GUI 58. The animation image 56 may be, e.g., a JAVA-based animation engine. For example, suitable animation software can be obtained from http://www.redted.com.

The subscriber database 44, the audio repository 46, and the animation image repository 48 are configured to store information and to provide information to the animated message constructor 50. The database 44 may be the Oracle 8i Enterprise Edition made by Oracle Corporation of Redwood City, Calif. The subscriber database 44 stores subscriber data, e.g., a user's log in/password and other records, and can be updated with information from the audio format engine 54. The database 44 can provide data, such as data identifying a subscriber, to the animated message constructor 50. The audio repository 46 and the animation image repository 48 respectively store the audio message file and animation image, and can provide the respective data to the animated message constructor 50.

The subscriber database 44 stores subscriber data records. These data records contain information relating to users, including user preference and access information, and data regarding system use by the user. For example, a subscriber data record may be:

```
sub_record {
    char    userid[32];
    char    password[32];
    char    user_phone_number
    int     message_cnt;
    int     total_message_cnt;
    long    last_login_time;
    int     prefer_delivery_type
}
``` where userid, password, and user_phone_number are self-explanatory, message_cnt is the number of new messages, total_message_cnt is the accumulated number of messages for the user, last_login_time is self-explanatory, and prefer_delivery_type is the user's preferred notification type, MT-SMS or e-mail.

The animated message constructor 50 is configured to animate the image by processing information from the database 44, the audio repository 46, and the animation image repository 48 into a suitable streaming-media-type file. The constructor 50 receives subscriber information from the subscriber database 44 regarding the locations of the image and the audio message. The constructor 50 combines the audio message from the audio repository 46 and the animated image from the animation image repository 48. The constructor 50 animates the image in accordance with the audio message, to attempt to synchronize the image and the audio message, using appropriate software. For example, suitable animation software can be obtained from http://www.redted.com. The constructor 50 combines the audio message and animated image into an animated audio message and constructs a streaming-media-type file, of the animated audio message, for the streaming server 40 and stores this file on a disc or other memory. To do this, the constructor 50 uses the subscriber data record and message header. The constructor 50 can alternatively construct the animated audio message in real time for a recipient, with or without storing the animated audio message.

Animated audio messages include message headers produced by the constructor 50. For example, a message header may be:

```
message_header {
    char    sender[32];
    char    recipient[32];
    long    msgid;
    int     delivery_type;
    int     delivery_option;
    varchar audio_location[256];
    varchar image_location[256];
    varchar streamfile_location[256];
;
``` where sender, recipient, and msgid fields are self-explanatory, delivery_type and delivery_option indicate whether notification of the animated audio message will be via email or SMS, and audio_location, image_location, and streamfile_location indicate memory addresses storing the audio message, the image, and the streaming file of the animated audio message, respectively.

The web server 42 communicates with the subscriber database 44 and the streaming server 40 and is the host for an AMS IP interface to recipients such as wireless devices or a computer. The web server 42 hosts a website that allows a user of, e.g., the wireless device or computer, to select an animation image and an audio message. The web server 42 further allows the user to select the delivery type of the animated audio message and to enter recipient information for the animated audio message. By communicating with the subscriber database 44, the web server 42 can store and retrieve subscriber information into and from the subscriber database 44. The web server 42 further hosts web pages associated with the animated audio messages that can be selected by accessing appropriate URLs to retrieve the desired animated audio message for downloading the message to a recipient's device and playing the message. The web server 42 can provide indicia of how to obtain the animated audio message. The web server 42 is configured to communicate with users in HTTP/WAP protocol data packets. Preferably, the web server 42 is an Apache web server such as the Apache 1.3.19 web server made by Apache Software Foundation of Forest Hill, Md.

The streaming server 40 is configured to communicate with the web server 42 and the animated message constructor 50 and to provide streaming animated audio message files to recipients. The streaming server 40 receives streaming file requests, redirected from the web server 42, and in response gets an appropriate streaming media file from the animated message constructor 50. Animated audio messages retrieved from the animated message constructor 50 are provided in Microsoft Metadirectory Services/Real-Time Streaming Protocol (MMS/RTSP protocol) to appropriate recipients via the Internet 22 or the mobile circuits/data network 20.

In operation many processes may be followed to provide, select, and play back animated audio messages. For example, multiple processes may optionally be used if the sender is a mobile handset and the receiver is a mobile handset or PC. Multiple processes may also be employed if the sender is a mobile handset or wireless PDA or personal computer and the receiver is a mobile handset or PC. Still further options exist if the sender is a wireless PDA or personal computer and the receiver is a mobile handset or personal computer.

Figure 4:
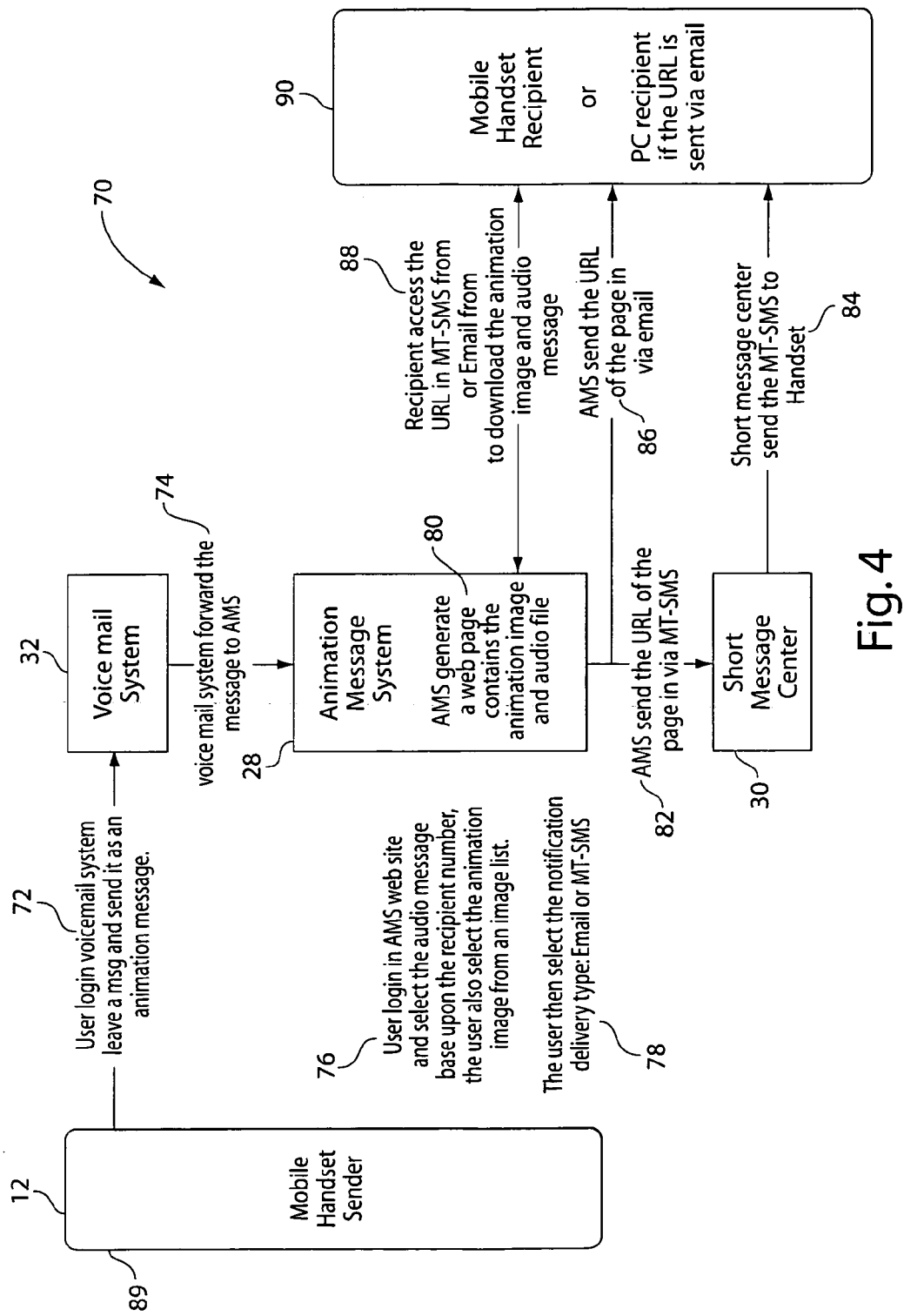
FIGS. 4–8 are schematic block flow diagrams of processes for providing animated audio messages to desired recipients.

FIG. 4 shows a process 70 of providing an animated audio message to a mobile handset or personal computer receiver 90 using a mobile handset sender 89. Referring to FIG. 4, with further reference to FIGS. 1 and 3, a mobile handset user can provide and/or select, as appropriate, an audio message and an image, and have the audio message and the image combined into an animated audio message, and a recipient can download and play the message.

At stage 72, the user of the sending device 89 records an audio message and designates it to be associated with an image. The user logs into the voice-mail system 32, and records the user's message in typical fashion. The user designates the message as a message to be associated with an image. For example, the user may press one or more buttons on a keypad, as prompted by the voice-mail system 32, to designate the audio message as being associated, or to be associated, with an image. Here the sending device is the mobile handset 12.

At stage 74, the voice-mail system 32 forwards a recorded message to the AMS 28. The AMS 28 receives the recorded message in the voice-mail interface 60, and stores the message in the audio repository 46, with the audio format engine 54 converting the audio message to an appropriate format if necessary.

At stage 76, the user selects the audio message and the image to be associated with the audio message to form the animated audio message. The user logs into the AMS web page or website hosted by the web server 42. The user selects the audio message using the website based upon, e.g., the desired recipient's telephone number. The user may also select the audio message based on, e.g., the sender's mailbox number, the recipient's mailbox number, or an identification number that is associated with the audio message. For example, the user can make the selection by entering the appropriate information before or after recording the audio message using the voice-mail system 32. The user also selects the desired animation image. The user can select the image by uploading an image or images, that may be animation or non-animation images. For non-animation images, the animation engine 56 will convert the image into an animation image format before storing the image in the animation image repository 48. The user may also select an animation image that is stored in the repository 48 from a list of images, e.g., that are associated with the sender 89. The user may have an account that has an associated list of available animation images from which the user may select a desired image. For example, the user may be presented with small icons associated with the images in the user's account list, and the user can, e.g., click on one of the icons to select the image.

At stage 78, the user selects the notification delivery-type. Possible notification delivery types are e-mail or MT-SMS. The user can select e-mail if the recipient is, e.g., a PC or other e-mail-accessible device. The user may wish to use the MT-SMS format if the receiving device 90 is, e.g., a handset similar to the mobile handset 12. The notification delivery-type selection is made by the user via the web server 42 and the GUI 58, with the GUI 58 communicating with the MT-SMS interface 62 or the e-mail interface 64 as appropriate.

At stage 80, the AMS 28 produces a web page from which the animated audio message can be accessed. The animated message constructor 50 animates the image in accordance with the audio message and provides a streaming-media-type file to the streaming server 40. The produced web page contains both the selected animation image and the selected audio message as they are accessible via the streaming server 40.

At stage 82 the AMS 28 sends the URL of the web page produced by the AMS 28 to the SMC 30. The URL of the web page is sent to the SMC 30 from the GUI 58 via the MT-SMS interface 62 in SMPP format.

At stage 84, the SMC 30 sends the URL received in stage 82 to the recipient 90, that may be, e.g., another mobile handset similar to the handset 12, or the computer 16. SMC 30 operates in known fashion to transfer the URL as MT-SMS to the recipient 90.

At stage 86, the AMS 28 transfers the URL to the recipient 90 if the sender chose e-mail as the notification delivery type. In this case, th URL of the web page associated with the animated audio message to the recipient 90 via the e-mail interface 64.

At stage 88, the recipient 90 accesses the web page hosted by the web server 42 containing the animated audio message in the AMS 28. The recipient accesses the appropriate web page using the URL provided via e-mail or MT-SMS. With the appropriate web page accessed, the recipient 90 downloads the animated audio message and plays the animated audio message on the receiving device 90.

Figure 5:
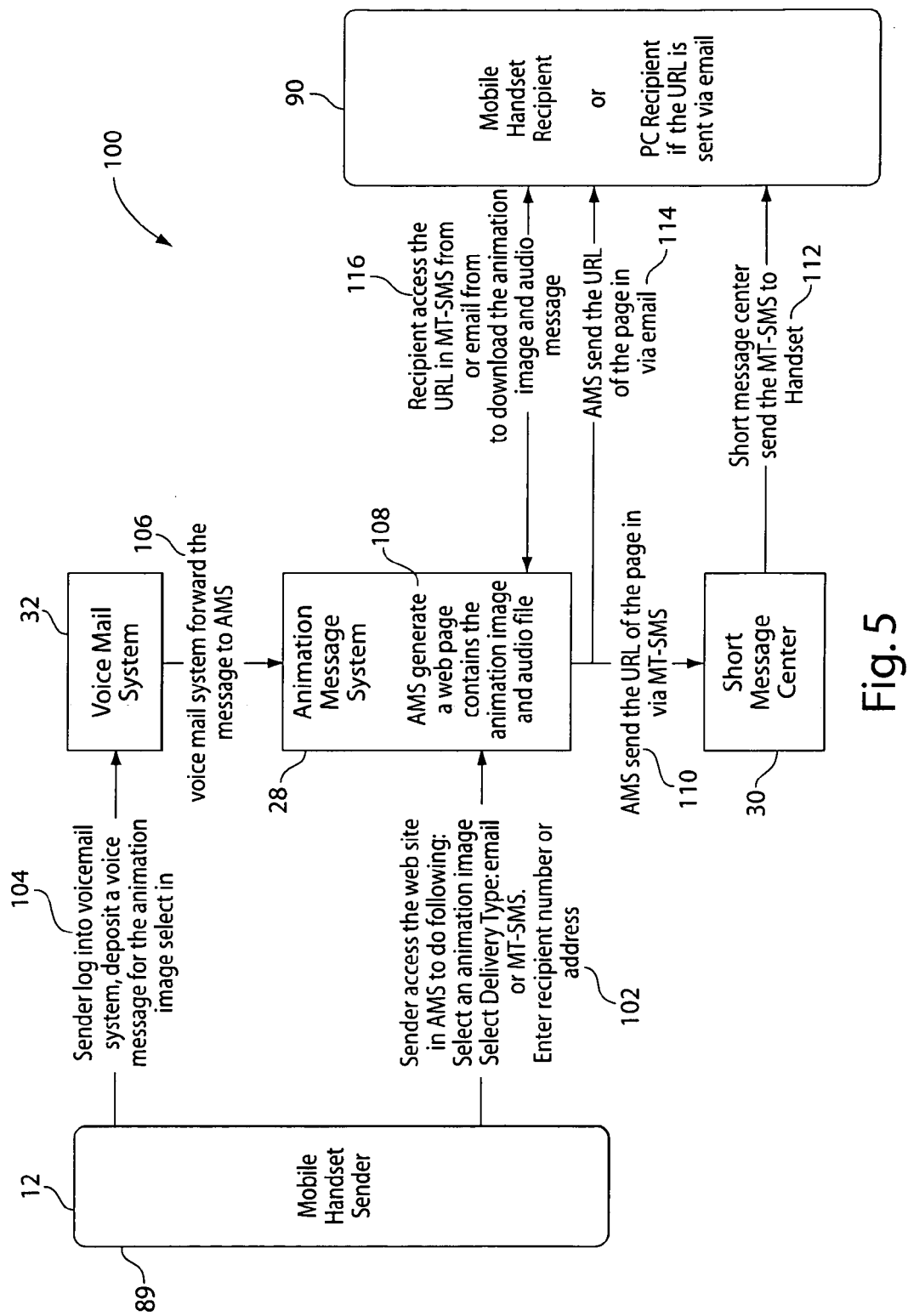

FIG. 5, with reference to FIGS. 1 and 3, shows another process 100 for sending an animated audio message using a mobile handset to a mobile handset or computer. Many stages of the process 100 are similar to the stages in the process 70 shown in FIG. 4.

At stage 102, the user of the handset 12 accesses the website maintained in the AMS 28. The user selects a desired animation image through the web server 42, the GUI 58, the animation engine 56, and the animation image repository 48. The user further selects the delivery type as either e-mail or MT-SMS, using the web server 42, the GUI 58, and, as appropriate, the MT-SMS interface 62 or the e-mail interface 64. The user further enters the telephone number or address, or other appropriate identifying information, of the recipient device 90 through the web server 42 and the GUI 58. This information can be used by the AMS 28 to associate the selected animation image with an audio message.

At stage 104, the user of the device 12 logs into the voice-mail system 32 to deposit an audio message. The user logs into the voice-mail system 32 and records an audio message in known fashion. The user further designates or otherwise provides information to allow the AMS 28 to associate the recorded audio message with an animation image.

Stages 106, 108, 110, 112, 114, and 116, are similar to stages 74, 80, 82, 84, 86, and 88, respectively, of process 70. These stages help produce and transfer a desired animated audio message to the user of the recipient device 90.

Figure 6:
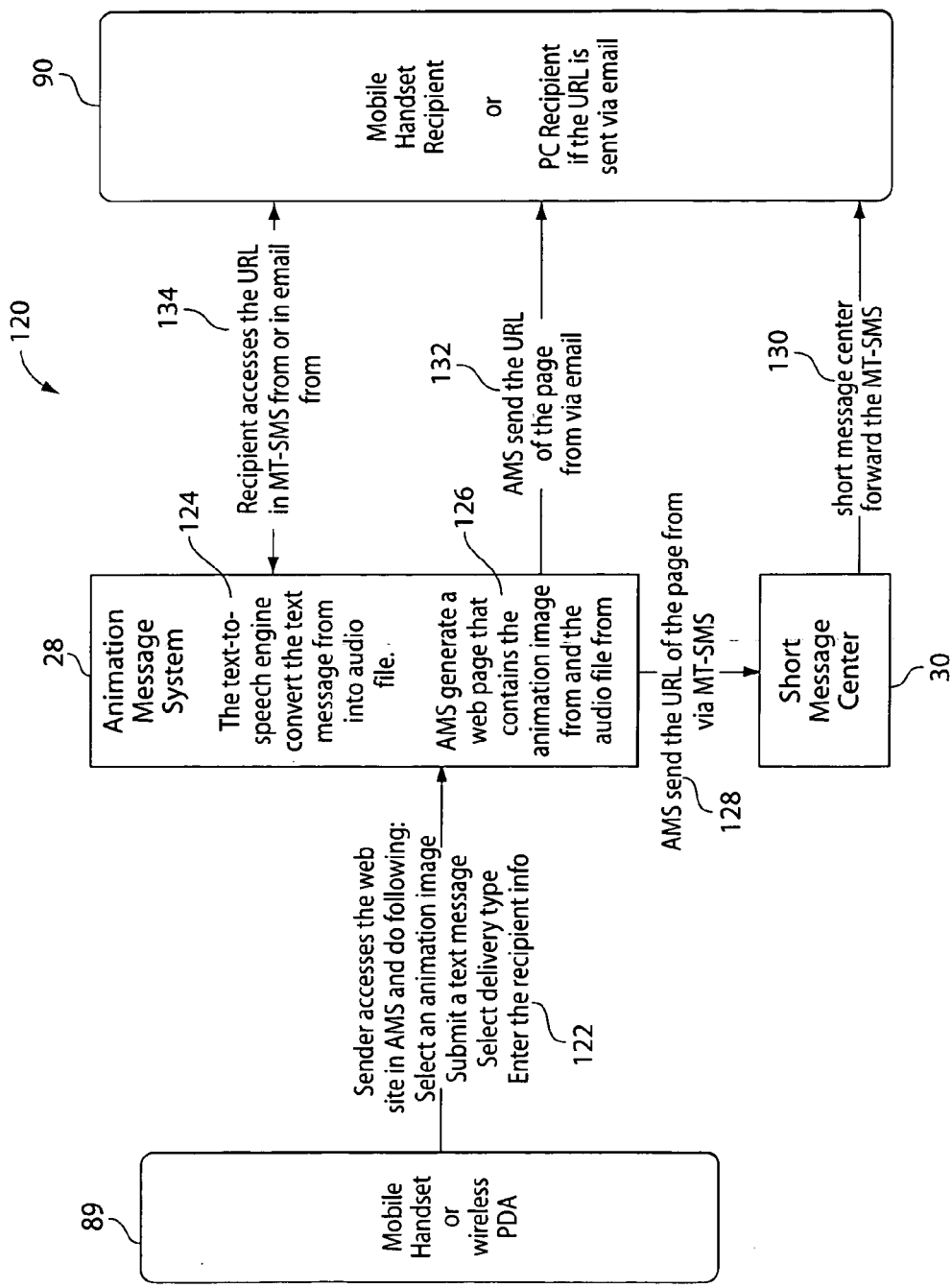

FIG. 6, with reference to FIGS. 1 and 3, shows a process 120 for transferring an animated audio message using a mobile handset or wireless PDA as the sending device 89 to a mobile handset or computer as the recipient device 90. In the process 120, an audio message is produced via a text message.

At stage 122, the user of the sending device 89 provides information to the AMS 28 to provide or select the audio message and animation image. The user logs into the web page hosted by the web server 42 and selects an animation image by providing information through the web server 42 to the GUI 58 that conveys the selection to the animation image repository 48. The user further provides a text message to the AMS 28. The user further provides information to select the delivery type as MT-SMS or e-mail. Also, the user submits information regarding recipient and/or recipient device 90.

At stages 124 and 126, the animated audio message is produced. The text message received from the sending device 89 is conveyed through the web server 42 to the GUI 58. The GUI 58 provides the text message to the text-to-speech engine 52, that converts the message to audio format, at stage 124, and provides the audio-format message to the audio format engine 54 for recording in the audio repository 46. At stage 126, the animated message constructor 50 constructs the animated audio message using the audio message produced from the text message, and the image selected by the user. The web server 42 produces a web page containing the animated audio message.

In stages 128, 130, 132, the recipient device 90 is notified of the web page containing the animated audio message. These stages are similar to stages 82, 84, 86 of FIG. 4.

At stage 134, the user of the recipient device 90 accesses the AMS 28 and retrieves the animated audio message. This stage is similar to stage 88 of FIG. 4.

Figure 7:
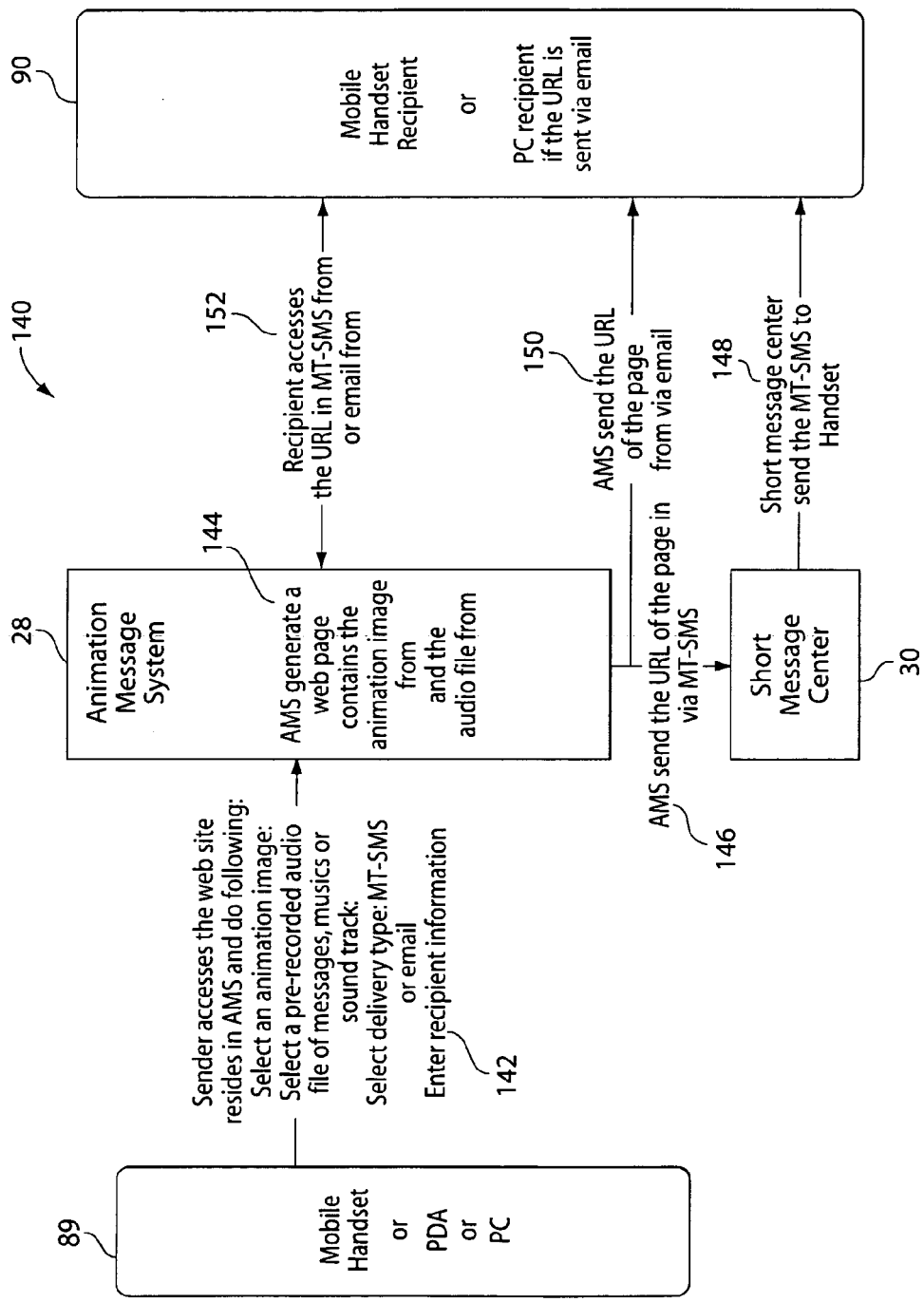

FIG. 7 shows another process 140 for conveying an animated audio message from a mobile handset or PDA or computer as the sending device 89 to a mobile handset or computer as the recipient device 90. In the process 140, the user of the sending device 89 selects a pre-recorded audio message versus logging into the voice-mail system 32 (FIG. 1) to record an audio message.

At stage 142, the sending device user provides information to select an audio message and an animation image, as well as delivery type and recipient information. This stage is similar to stage 122 of FIG. 6. In stage 142, however, the user selects a pre-recorded audio file such as a message, music, or sound track by providing appropriate information to the AMS 28. Using the information provided at stage 142, at stage 144 the AMS 28 produces a web page containing the animated audio message.

At stages 146, 148, 150, 152, that are similar to stages 128, 130, 132, 134 of FIG. 6, the URL of the web page produced at stage 144 is provided to the user of the recipient device 90, and the recipient uses the recipient device 90 to retrieve the animated audio message. The user of the recipient device 90 retrieves the animated audio message by accessing and downloading the message from the web page of the AMS 28.

Figure 8:
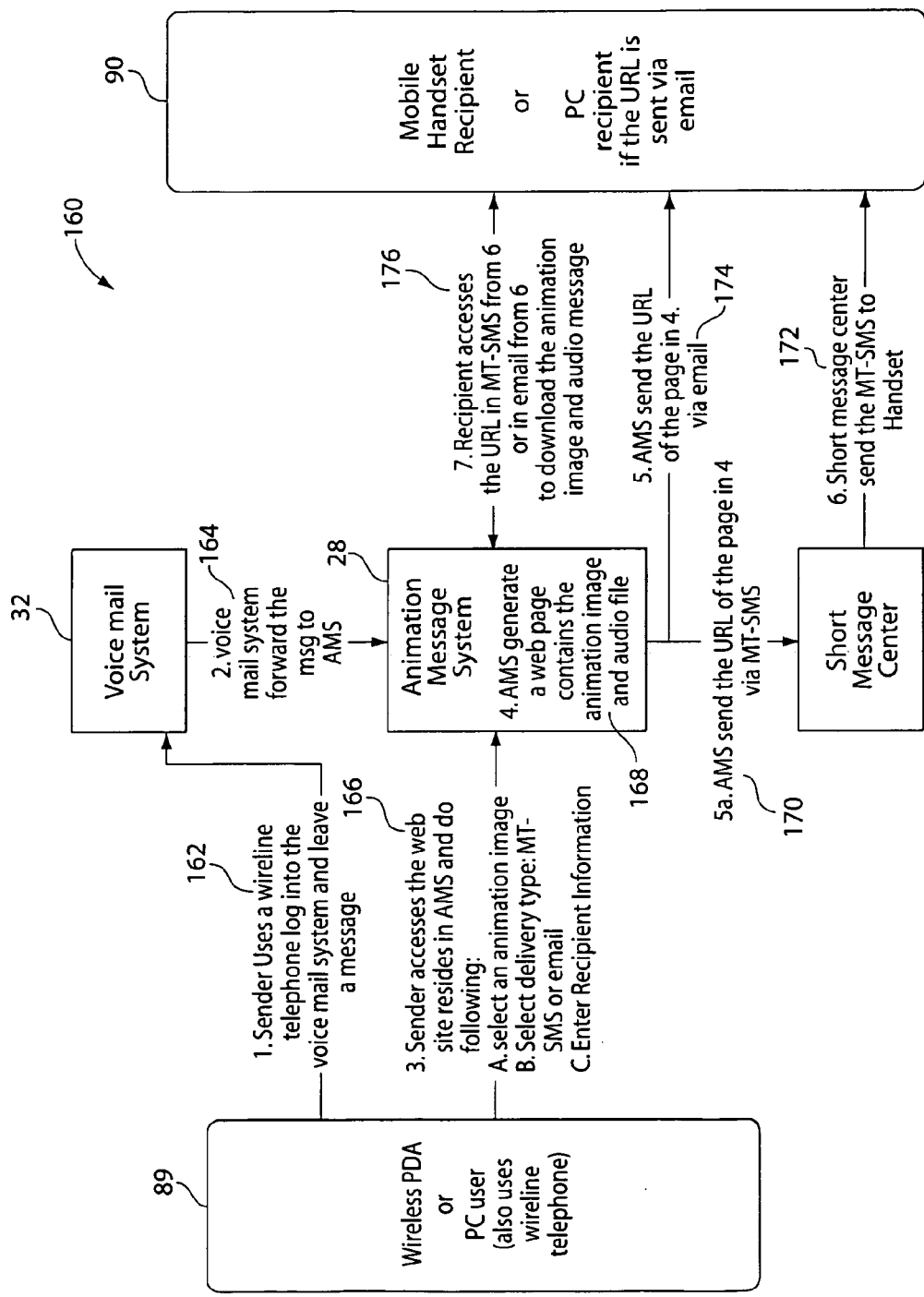

FIG. 8 shows a process 160 of transferring an animated audio message to a recipient device 90 using a sending device 89 that may be a wireless PDA or computer, and includes recording an audio message in the voice-mail system 32 using a wireline telephone. In the process 160, at stage 162, the user uses a wireline telephone to log into the voice-mail system 32 and deposit an audio message. Stages 164, 166, 168, 170, 172, 174, and 176, are similar to stages 106, 102, 108, 110, 112, 114, and 116, of FIG. 5 for providing additional information to the AMS 28 to produce a website containing an animated audio message, for providing an appropriate URL to the user of the device 90, and for retrieving and downloading the animated audio message and playing this message at the device 90.

The specific processes 70, 100, 120, 140, and 160 shown in FIGS. 4–8 are exemplary and not limiting. Stages can be added, removed, and/or rearranged without departing from the scope and spirit of the invention or the appended claims.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:

1. A method for providing an animated audio message, the method comprising:
   receiving an audio-message indication, related to an audio message, via a first wireless communication;
   receiving an image indication, related to an image, via a second wireless communication;
   associating the image with the audio message;
   animating the image in accordance with the audio message to produce the animated audio message;
   storing the animated audio message; and
   sending retrieval information toward a recipient for retrieving the animated audio message, the recipient being wirelessly identified.

2. The method of claim 1 wherein the image is a stored image and the image indication identifies the stored image.

3. The method of claim 1 wherein the animated audio message is stored in association with a packet-switched-network address.

4. The method of claim 3 wherein the address is a web address.

5. The method of claim 3 wherein the retrieval information includes the address.

6. The method of claim 1 wherein the retrieval information is in a format indicated wirelessly.

7. The method of claim 6 wherein the format is e-mail.

8. The method of claim 6 wherein the format is mobile-terminated short message service, and the retrieval information is sent to the recipient via a short message center.

9. The method of claim 1 further comprising receiving the audio message from a voice-mail system.

10. The method of claim 9 wherein the audio message is stored in the voice-mail system and the audio-message indication identifies the audio message stored in the voice-mail system.

11. The method of claim 1 wherein first wireless communication occurs before the second wireless communication.

12. The method of claim 1 wherein the first and second wireless communications are portions of the same communication.

13. The method of claim 1 wherein the audio-message indication includes the audio message.

14. The method of claim 1 wherein the audio-message indication includes text, the method further comprising converting the text into the audio message.

15. The method of claim 1 wherein the audio-message indication includes sufficient information to identify the audio message.

16. The method of claim 1 further comprising storing a caller's audio message in a voice-mail system.

17. The method of claim 1 wherein the retrieval information is an email message containing a URL of a web page.

18. The method of claim 1 wherein the retrieval information is a MT-SMS message containing a URL of a web page.

19. A computer program product including computer-executable instructions for causing a computer to:
   receive an audio-message indication, related to an audio message, via a first wireless communication;
   receive an image indication, related to an image, via a second wireless communication;
   associate the image with the audio message;
   animate the image in accordance with the audio message to produce an animated audio message;
   store the animated audio message;
   receive a recipient indication wirelessly, the recipient indication being indicative of an intended recipient of the animated audio message; and
   send retrieval information toward the intended recipient for retrieving the animated audio message.

20. The computer program product of claim 19 wherein the image is a stored image and the image indication identifies the stored image.

21. The computer program product of claim 19 wherein the animated audio message is stored in association with a packet-switched-network address.

22. The computer program product of claim 21 wherein the address is a web address, the computer program product further comprising instructions for causing the computer to provide a web page providing access to the animated audio message.

23. The computer program product of claim 21 wherein the retrieval information includes the address.

24. The computer program product of claim 19 further comprising instructions for causing the computer to wirelessly receive a format indication indicative of a format of the retrieval information, and wherein the instructions for causing the computer to send the retrieval information cause the computer to send the retrieval information in the indicated format.

25. The computer program product of claim 24 wherein the format is e-mail.

26. The computer program product of claim 24 wherein the format is mobile-terminated short message service, and the instructions for causing the computer to send the retrieval information cause the computer to send the retrieval information toward the intended recipient via a short message center.

27. The computer program product of claim 19 wherein first wireless communication occurs before the second wireless communication.

28. The computer program product of claim 19 wherein the first and second wireless communications are portions of the same communication.

29. The computer program product of claim 19 wherein the audio-message indication includes the audio message.

30. The computer program product of claim 19 wherein the audio-message indication includes text, the computer program product further comprising instructions for causing the computer to convert the text into the audio message.

31. The computer program product of claim 19 wherein the audio-message indication includes sufficient information to identify the audio message.

32. A system for providing animated audio messages, the system comprising:
  a wireless interface configured to receive wireless communications from a wireless communications device, the wireless communications providing or identifying an audio message and providing or identifying an image;
  an animator coupled to the wireless interface and configured to animate the image in accordance with the audio message to form an animated audio message;
  an animation interface coupled to the animator and configured to transfer the animated audio message from the animator toward a desired destination; and
  a voice-mail interface coupled to the wireless interface and configured to receive the audio message.

33. The system of claim 32 wherein the animation interface is configured to transfer the animated audio message toward the desired destination in a wireless communication.

34. The system of claim 32 further comprising an audio format engine configured to receive an audio message and convert a format of the received audio message to a desired audio message format if appropriate.

35. The system of claim 34 further comprising an audio storage device configured to store the audio message in the desired audio message format.

36. The system of claim 35 further comprising an image engine configured to receive images and convert the images as appropriate into a desired image format.

37. The system of claim 36 further comprising an image storage device coupled to image engine and configured to store the image in the desired image format.

38. The system of claim 37 wherein the wireless communications identify the audio message and the image, and wherein the animator is coupled to the audio storage device and the image storage device and is configured to retrieve the audio message and the image from the storage devices in accordance with the wireless communications.

39. The system of claim 37 wherein the animation interface comprises a streaming server configured to transfer the animated audio message toward the desired destination as a streaming file.

40. The system of claim 39 wherein the animation interface further comprises a web server configured to provide access to the animated audio message via a web page related to the animated audio message.

41. The system of claim 40 further comprising a Mobile-Terminated Short Message System (MT-SMS) interface coupled to the wireless interface and configured to transmit an MT-SMS-format message toward the desired recipient, the MT-SMS-format message including a web address of the web page provided by the web server related to the animated audio message.

42. The system of claim 40 further comprising an e-mail interface coupled to the wireless interface and configured to transmit an e-mail message toward the desired recipient, the e-mail message including a web address of the web page provided by the web server related to the animated audio message.

* * * * *

UNITED STATES PATENT AND TRADEMARK OFFICE
CERTIFICATE OF CORRECTION

PATENT NO. : 7,085,259 B2 Page 1 of 1
APPLICATION NO. : 09/918704
DATED : August 1, 2006
INVENTOR(S) : Xuejun Wang, Dongxiao Ji and Joseph D. Plansky It is certified that error appears in the above-identified patent and that said Letters Patent is hereby corrected as shown below:

In the Claims:

In Claim 39, at Column 14, line 24, change "CLAIM 37" to --CLAIM 32--

Signed and Sealed this

Twenty-eighth Day of November, 2006

JON W. DUDAS
*Director of the United States Patent and Trademark Office*